(12) United States Patent
Hunter (10) Patent No.: US 9,485,381 B1
(45) Date of Patent: Nov. 1, 2016

(54) SCANNER INTERFACE AND PROTOCOL (71) Applicant: Xerox Corporation, Norwalk, CT (US)

(72) Inventor: Timothy M. Hunter, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/705,609

(22) Filed: May 6, 2015

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/04* | (2006.01) | |
| *H04L 12/855* | (2013.01) | |
| *H04L 29/06* | (2006.01) | |
| *H04N 1/00* | (2006.01) | |

(52) U.S. Cl.
CPC ............ *H04N 1/04* (2013.01); *H04L 47/2466* (2013.01); *H04L 69/22* (2013.01); *H04N 1/00114* (2013.01); *H04N 2201/0094* (2013.01)

(58) Field of Classification Search
CPC ............... H04N 1/04; H04N 1/00114; H04N 2201/0094; H04L 47/2466; H04L 69/22
USPC .................................................. 358/1.1–1.18
See application file for complete search history.

(56) References Cited

U.S. PATENT DOCUMENTS

| | | | | |
|---|---|---|---|---|
| 8,870,073 | B2* | 10/2014 | Detwiler | ............. G07G 1/0045 |
| | | | | 235/383 |
| 8,950,672 | B2* | 2/2015 | Collins | ............. G06K 7/10554 |
| | | | | 235/440 |

* cited by examiner

*Primary Examiner* — Douglas Tran (57) ABSTRACT

An example of an apparatus for transferring data over a Mobile Industry Processor Interface (MIPI) includes a scan bar for scanning an image, an analog front end (AFE) module in communication with the scan bar for receiving a plurality of video images of the image that is scanned by the scan bar, a translation logic module in communication with the AFE module to convert the plurality of video images into a scanlink frame using a MIPI communication protocol, wherein the scanlink frame comprises a frame start packet, a scanlink header packet, the plurality of video images and a frame end packet, a MIPI input interface in communication with the translation logic module to receive the scanlink frame and a processor in communication with the MIPI input interface to process the scanlink frame to generate a scanned image file using the scanlink frame.

20 Claims, 5 Drawing Sheets

SCANNER INTERFACE AND PROTOCOL

The present disclosure relates generally to improving communication between scanners and a system controller and, more particularly, to an apparatus and method for transferring data over a Mobile Industry Processor Interface (MIPI).

BACKGROUND

Current multi-function device manufacturers use proprietary interfaces to transfer video data from a scanning device to a system controller. The system controller then processes the scanner video data using custom hardware typically implemented in an Application Specific Integrated Circuit (ASIC) or System on Chip (SO) devices.

However, ASIC/SOCs are expensive to develop (e.g., $1 million to $10 million) depending on size and technology, have long lead times (e.g., 15-24 months) and have fixed functionalities. In addition, as the ASICs are being developed, the technology or protocols may change that may cause portions of the ASIC to be obsolete or require use of older and more expensive technologies even before the ASICs are finished being developed and manufactured.

SUMMARY

According to aspects illustrated herein, there are provided an apparatus and method for transferring data over a Mobile Industry Processor Interface (MIPI). One disclosed feature of the embodiments is an apparatus comprising a scan bar for scanning an image, an analog front end (AFE) module in communication with the scan bar for receiving a plurality of video images of the image that is scanned by the scan bar, a translation logic module in communication with the AFE module to convert the plurality of video images into a scanlink frame using a MIPI communication protocol, wherein the scanlink frame comprises a frame start packet, a scanlink header packet, the plurality of video images and a frame end packet, a MIPI input interface in communication with the translation logic module to receive the scanlink frame and a processor in communication with the MIPI input interface to process the scanlink frame to generate a scanned image file using the scanlink frame.

Another disclosed feature of the embodiments is a method for transferring data over a MIPI comprising scanning an image to produce a plurality of video images, converting the plurality of video images into a scanlink frame using a MIPI communication protocol, wherein the scanlink frame comprises a frame start packet, a scanlink header packet, the plurality of video images and a frame end packet, sending the scanlink frame to a processor over a MIPI interface and generating, by the processor, a scanned image file using the scanlink frame.

Another disclosed feature of the embodiments is a non-transitory computer-readable medium having stored thereon a plurality of instructions, the plurality of instructions including instructions, which when executed by a processor, cause the processor to perform operations comprising scanning an image to produce a plurality of video images, converting the plurality of video images into a scanlink frame using a MIPI communication protocol, wherein the scanlink frame comprises a frame start packet, a scanlink header packet, the plurality of video images and a frame end packet, sending the scanlink frame to a processor over a MIPI interface and generating, by the processor, a scanned image file using the scanlink frame.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for transferring data over a MIPI within a multi-function device (MFD). As discussed above, current multi-function device manufacturers use proprietary interfaces to transfer video data from a scanning device to a system controller. The system controller then processes the scanner video data using custom hardware typically implemented in an Application Specific Integrated Circuit (ASIC) or System on Chip (SOC) device.

However, ASICs are expensive to develop (e.g., $1 million to $10 million) depending on size and technology, have long lead times (e.g., 15-24 months) and have fixed functionality. In addition, as the ASICs are being developed, the technology or protocols may change that may cause portions of the ASIC to be obsolete or require use of older and more expensive technologies even before the ASICs are finished being developed and manufactured.

Embodiments of the present disclosure remove the need to use ASICs in the system controller and leverage microprocessor technology that incorporates Mobile Industry Processor Interfaces (MIPI). Microprocessor technology has advanced to the point where there is sufficient processing power in the processor core(s), graphics processing unit (GPU), and other specialized hardware engines to do the image processing in software instead of ASICs. Many of the current and future generations of microprocessors incorporate MIPI interfaces.

Embodiments of the present disclosure allow data from a scanner to be transmitted to a microprocessor in a system controller (as opposed to an ASIC) within a MFD. The microprocessor may then process the data. As a result, the cost and time to develop an ASIC is eliminated.

Figure 1:
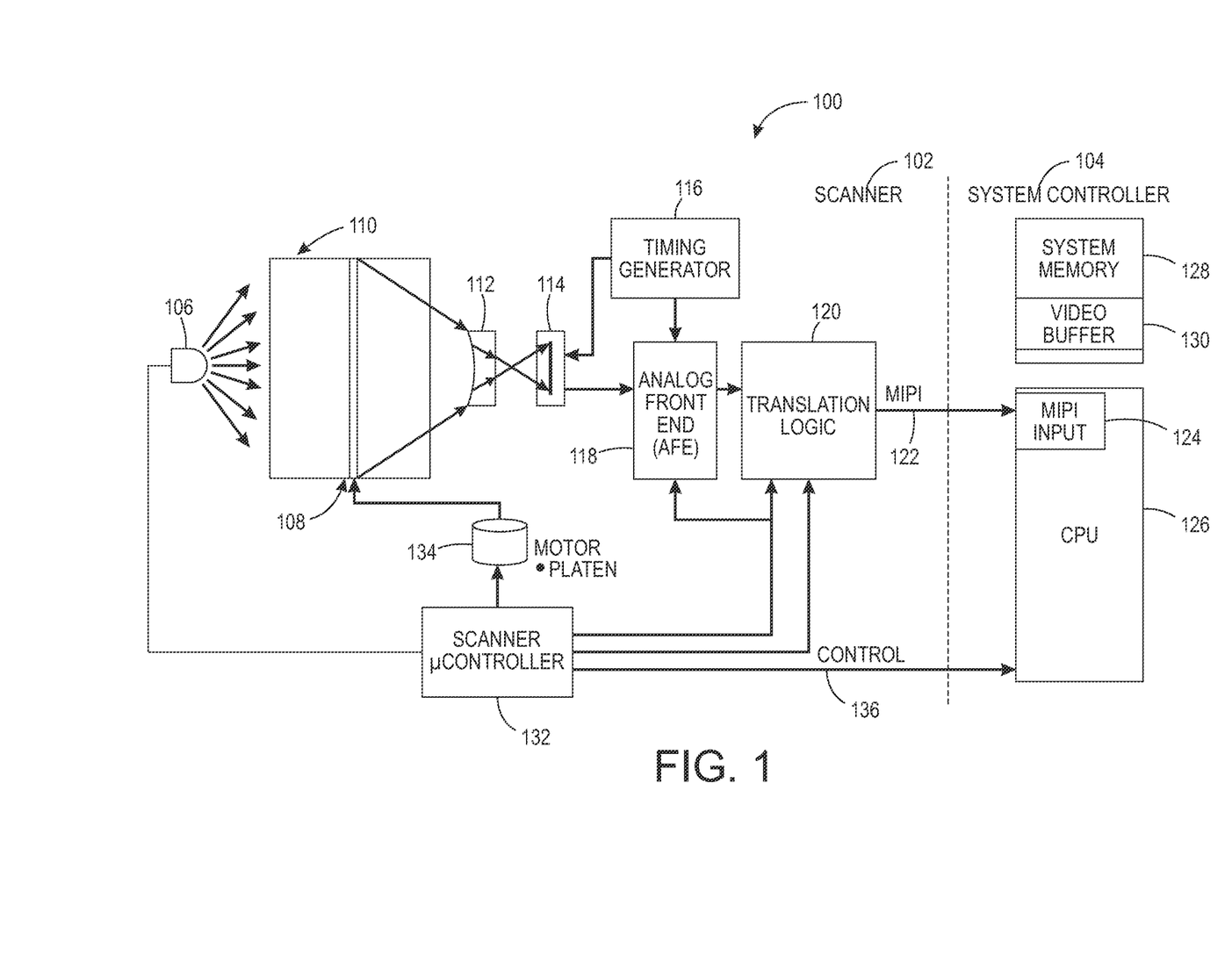
FIG. 1 illustrates an example block diagram of an apparatus of the present disclosure.

FIG. 1 illustrates an example apparatus 100 of the present disclosure. It should be noted that the apparatus 100 may be an MFD having scanning, printing, copying and faxing capabilities. In one embodiment, the apparatus 100 may include a scanner 102 and a system controller 104. In one embodiment, the scanner 102 may include a light source or a lamp 106, a scan bar 108, a lens 112, a charge coupled device (CCD) 114, a timing generator 116, an analog front end (AFE) module 118, a translation logic 120, a scanner microcontroller 132 and a platen motor 134.

In one embodiment, the platen motor 134 may be coupled to the scan bar 108 and control the movement of the scan bar 108 over an image 110. In one embodiment, the scan bar 108 may scan the image 110 and transmit lines of video data through the lens 112 and the CCD 114 to the AFE module 118. The AFE module 118 and the CCD 114 may be synchronized via the timing generator 116. The AFE module 118 may collect the analog video images and convert the analog signals into a digital signal.

Typically, the AFE module 118 supports a variety of different types of line array type sensors. The AFE market had never standardized a video output interface. As a result, a custom ASIC processor would be required to process the video images and transmit the processed video images to another custom ASIC processor in the system controller 104 over a proprietary connection and interface.

In one embodiment, the custom ASIC processor in the scanner 102 is replaced with the translation logic module 120. In one embodiment, the translation logic module 120 may convert the video image data from the AFE module 118 into a format that is compatible with a MIPI communication protocol. In one embodiment, the translation logic module 120 may be implemented as a field programmable gate array (FPGA).

In one embodiment, the MIPI communication protocol may be a RAWxx format as defined by a MIPI Camera Serial Interface 2 (CSI-2) standard. In one embodiment the "xx" of the RAWxx format may represent a number of bits per pixel as defined by the MIPI CSI-2 standard.

In one embodiment, a new scanlink frame may be used to transmit the video images converted into the RAWxx format for transmission over a MIPI connection 122. The format of the scanlink frame is discussed in further detail below with reference to FIG. 2.

In one embodiment, the system controller 104 may part of a digital front end (DFE) of the apparatus 100. In one embodiment, the system controller 104 includes a central processing unit (CPU) 126 (also referred to as a processor or microprocessor). It should be noted that the processor 126 does not include and should not be interpreted to be equivalent to an ASIC processor.

In one embodiment, the processor 126 may be in communication with a MIPI input interface 124. The MIPI connection 122 may be coupled to the MIPI input interface 124 and the translation logic module 120. In one embodiment, the system controller 104 may also include a system memory 128 and a video buffer 130.

In one embodiment, the scanlink frames containing the video images may be transmitted from the scanner 102 to the system controller 104 via the MIPI connection 122. The scanlink frames may be stored in the system memory 128 and the video images may be stored in the video buffer 130 as the processor 126 processes the video images to generate a scanned image file of the image 110.

Figure 3:
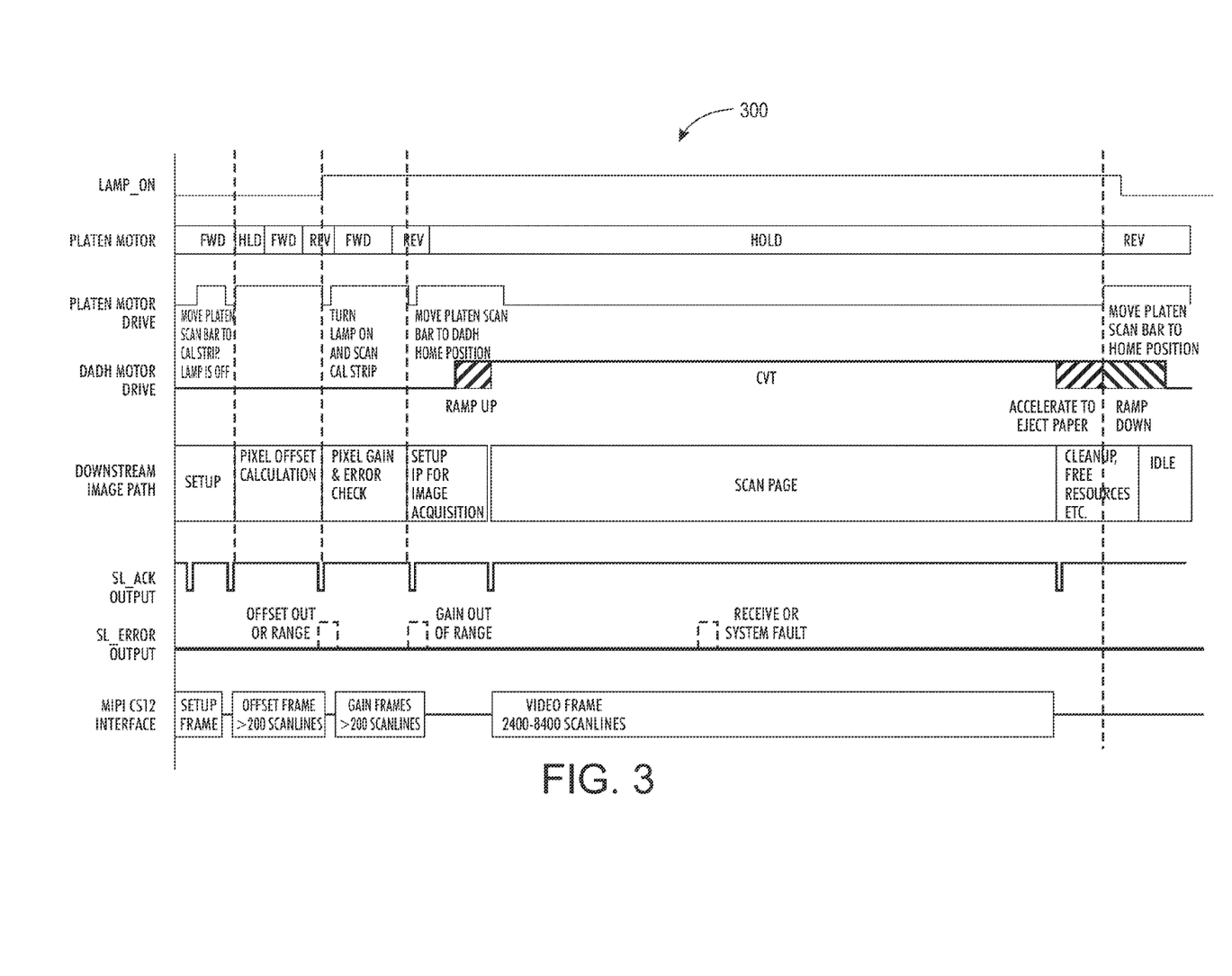
FIG. 3 illustrates an example timing diagram.

In one embodiment, the scanner microcontroller 132 may be in communication with the processor 126, the translation logic module 120, the AFE module 118 and the platen motor 134. The scanner microcontroller 132 may send a signal to the AFE 118 and the translation logic module 120 to prepare for receiving video images from the scan bar 108 when the scanner microcontroller 132 starts the platen motor 134. In addition, the scanner microcontroller 132 may begin and end each scan of the image 110 based on acknowledgment signals or error signals received from the processor 126. An example timing diagram is illustrated in FIG. 3 and discussed below.

In one embodiment, calibration video images may also be sent before the video images of the image 110 using the same process as described above for sending the video images of the image 110. For example, instead of the image 110, a calibration strip may be placed in the scanner 102 and scanned by the scan bar 108 with the light source 106 turned off to collect black calibration video images. The black calibration video images may be translated into black calibration scanlink frames and transmitted to the processor 126 over the MIPI connection 122. In one embodiment, the black calibration video images may be used to calibrate offset of each pixel.

Similarly, the calibration strip may be scanned by the scan bar 108 with the light source 106 turned on to collect white calibration video images. The white calibration video images may be translated into white calibration scanlink frames and transmitted to the processor over the MIPI connection 122. In one embodiment, the white calibration video images may be used to calibrate a gain for each pixel.

Figure 2:
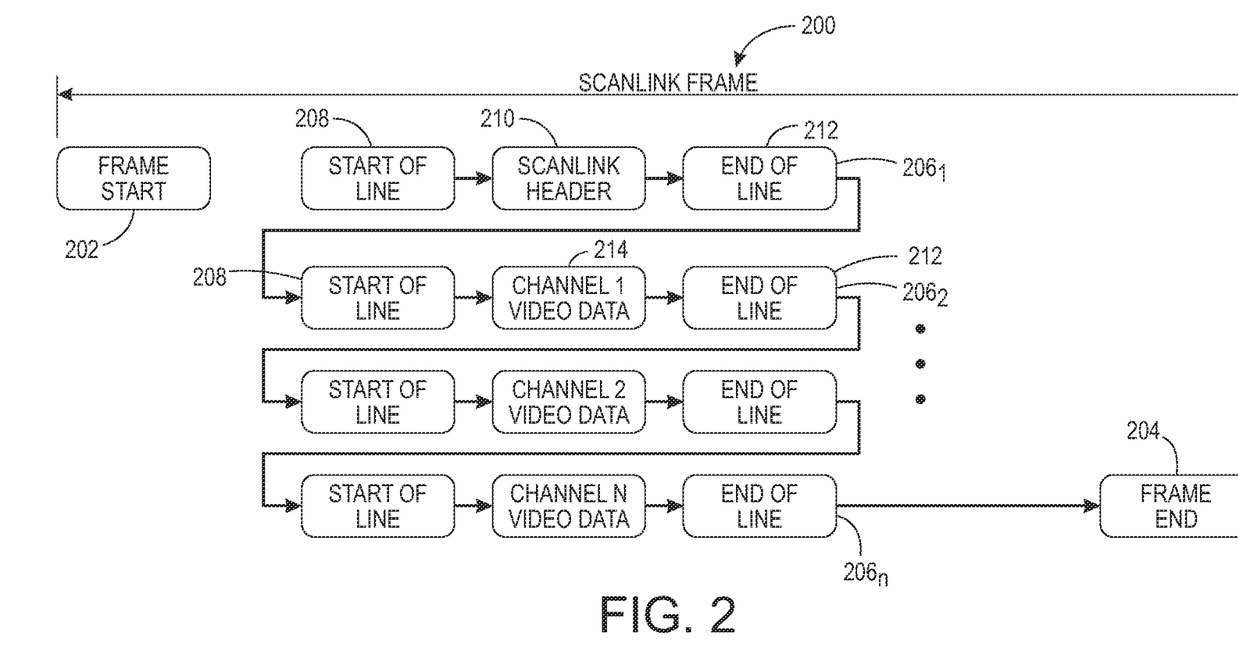
FIG. 2 illustrates an example scanlink frame.

As noted above, the present disclosure uses a new frame format referred to as a scanlink frame. FIG. 2 illustrates an example of a scanlink frame 200. In one embodiment, the scanlink frame 200 includes a frame start packet 202, a plurality of scan lines $206_1$ to $206_n$ (also referred to herein individually and collectively as scan line or scan lines 206) and a frame end packet 204. In one embodiment, each one of the plurality of scan lines $206_1$ to $206_n$ may include a start of line packet 208, a data packet 210 or 214 and an end of line packet 212.

In one embodiment, the data packet 210 of the first scan line $206_1$ of each scanlink frame 200 that is transmitted may be a scanlink header packet. In one embodiment, the scanlink header packet may include all the information necessary for the processor 126 to process the video images within the scanlink frame 200 to generate the scanned image. For example, the scanlink header packet may include metadata related to the image 110 that is being scanned. In one embodiment, the metadata may include a type of data that is being transmitted (e.g., black calibration video images, white calibration video images, normal video images, and the like), a type of color (e.g., black and white, color, grayscale, and the like), a page size, a CCD color registration offset, a data resolution (e.g., 3×3, 6×6, 12×12, and the like), or any other metadata that is needed by the processor 126 to process the video images.

In one embodiment, the remaining data packets 214 in the scan lines $206_2$ to $206_n$ may each be a line of video images scanned by the scan bar 108. For example, the scan bar 108 may scan the image 110 on a line by line basis. In one embodiment, each line scanned by the scan bar 108 may be a video image. As a result, a number of scan lines "n" may be a function of a number lines (e.g., video images) needed to scan the image 110 plus one (e.g., including the data packet 210 that is the scanlink header packet). In other words, if the scan bar 108 scans 100 lines of video images, then the scanlink frame 200 would include 101 scan lines 206 (e.g., 1 scan line with the scanlink header plus 100 lines of video images).

In one embodiment, video images of each image that is scanned would be transmitted via the scanlink frame 200. For example, if calibration is needed and black calibration video images and white calibration video images are transmitted to the processor 126, then the black calibration video images would be transmitted as a black calibration scanlink frame and the white calibration video images would be transmitted as a white calibration scanlink frame.

In addition, the black calibration scanlink frame and the white calibration scanlink frame would each include a data packet in the first scan line that is the scanlink header packet. The scanlink header packet for the black calibration scanlink frame and the white calibration scanlink frame would include metadata for the calibration strip that is scanned with the light off for and metadata for the calibration strip that is scanned with the light off, respectively.

As is evident from the description of the scanlink frame 200, the design of the scanlink frame 200 allows any format and type of data to be transmitted over a single MIPI interface/channel. In other words, the metadata need by the processor 126 is also transmitted with the video images over the MIPI connection 122 and the MIPI input interface 124. As a result, the design of the apparatus 100 does not require a side channel or separate channel to transmit the metadata to the processor 126.

For example, the metadata of the image 110 is needed by the processor 126 to process the scanned video images and generate the scanned image file. Without the metadata, the processor 126 would be unable to process the video images in the scanlink frame 200. Some designs may attempt to use a side channel to transmit the metadata separately. However, the user of the side channel adds additional wiring, hardware and software that are needed to control the side channel and coordinate the metadata with the video images. Thus, the embodiments of the present disclosure avoid these inefficient designs by creating the scanlink frame 200 that can send all of the necessary metadata and scanned video images over a single MIPI connection.

FIG. 3 illustrates an example timing diagram 300 of various components within the apparatus 100. In one embodiment, the timing diagram 300 illustrates a timing between the lamp (Lamp_ON), the platen motor, the platen motor drive, a duplex automatic document handler (DADH) motor drive, a downstream image path, a scanlink frame acknowledgement output (SL_ACK output) and a scanlink frame error output (SL_ERROR output). The timing diagram 300 also includes an illustration of the scanlink frames 200 that are sent over the MIPI connection 122 (MIPI CSI2 Interface).

In one embodiment, the platen motor illustrates which direction the platen motor 134 is moving and the platen motor drive illustrates when the motor is on and off. In one embodiment, the lamp, the platen motor, the platen motor drive and the DADH motor drive signals are generated within the scanner 102. In one embodiment, the downstream image path represents actions of a state machine executed by the processor 126. In one embodiment, the SL_ACK output and SL_ERROR output are generated by the processor 126. The MIPI CSI2 Interface line is not a signal diagram, but illustrates as an example to help the reader in visualizing when the scanlink frames 200 are sent during the timing diagram 300.

In one embodiment, the lamp is turned off as indicated by the low signal on Lamp_ON. The platen motor is in a forward (FWD) position as the platen motor drive is moved (platen motor drive signal is high) into position to scan a calibration strip. The DADH motor drive signal is low. In one embodiment, a setup scanlink frame may be transmitted. When the processor 126 receives the setup frame, the processor may perform the setup and generate a high SL_ACK output signal.

At a later time, the platen motor is held (HLD) until the scanning of the calibration strip is ready to begin. The platen motor may then be changed to a FWD position to scan the calibration strip with the lamp off to generate the black calibration video images (e.g., also referred to as the pixel offset calculation and offset scanlink frame). The processor receives the black calibration scanlink frame, generates a high signal for the SL_ACK output and the downstream image path begins processing the pixel offset calculation.

The platen motor is moved to a reverse (REV) position and the platen motor drive is turned on to move the platen motor back to a starting position to scan the calibration strip for the white calibration video images. The lamp is turned on (Lamp_ON signal is changed to high) and remains on for the remaining scans. The platen motor is moved to a FWD position and the platen motor drive is turned on to scan the calibration strip with the lamp turned on. The calibration strip is scanned to generate the white calibration scanlink frame (e.g., also referred to as the pixel gain & error check or gain frame scanlink frame). The processor receives the white calibration scanlink frame and generates a high signal for the SL_ACK output and the downstream image path begins processing the pixel gain & error check.

The platen motor is moved to a REV position and the platen motor drive is turned on to move the platen motor back to a home position. The DADH Motor drive is ramped up and turned on and the downstream image path sets up an image path for an image acquisition. The processor generates a high signal for the SL_ACK output to indicate it is ready. The platen motor is moved to a hold position as the DADH motor drive turns on to feed the image through the scanner. The scanlink frame with the video images scanned is transmitted to the processor. The processor generates a high signal for the SL_ACK output and the downstream image path processes the scan page.

When the scanlink frame ends, the lamp is turned off, the platen motor is changed to a REV position, and the platen motor drive is turned on to move the platen motor back to a home position. The DADH motor drive is ramped down and turned off. The processor generates a high signal for the SL_ACK output that scanlink frame was received in its entirety. The downstream image path performs a cleanup and frees up resources and moves to an idle state.

In one embodiment, if the processor does not receive a scanlink frame or receives and incomplete scanlink frame, then the processor may generate a SL_ERROR output signal. For example, in FIG. 3, the high signal for SL_ERROR output illustrated in dashed lines may be generated and the SL_ACK output would remain low.

In one embodiment, the SL_ERROR output signal may be generated by the scanner microcontroller 132 if the SL_ACK output high signal is not received within a predefined time period or countdown period. For example, the scanner microcontroller 132 may know a length of the scanlink frame that is transmitted. The predefined time period may begin counting down at a time when the scanlink frame should have been received by the processor 126. If the predefined time period expires before receiving the SL_ACK output high signal then the scanner microcontroller 132 may generate an SL_ERROR high signal.

In one embodiment, when the SL_ERROR high signal is received, the platen motor may be returned to the home position. In addition, the lamp may be turned off, the downstream image path may return to the setup and the DADH motor drive may return to an off position such that the scanner may start scanning an image from the beginning.

It should be noted that FIG. 3 is only provided as an example timing diagram 300. The timing of the various components within the apparatus 100 may vary and be implemented in additional ways that are within the scope of the present disclosure. For example, the calibration video images and associated scanlink frames may be optional. In other words, calibration need not be performed before each image that is scanned. The calibration may be performed periodically (e.g., based on a pre-defined timer period or pre-defined number of image scans).

Figure 4:
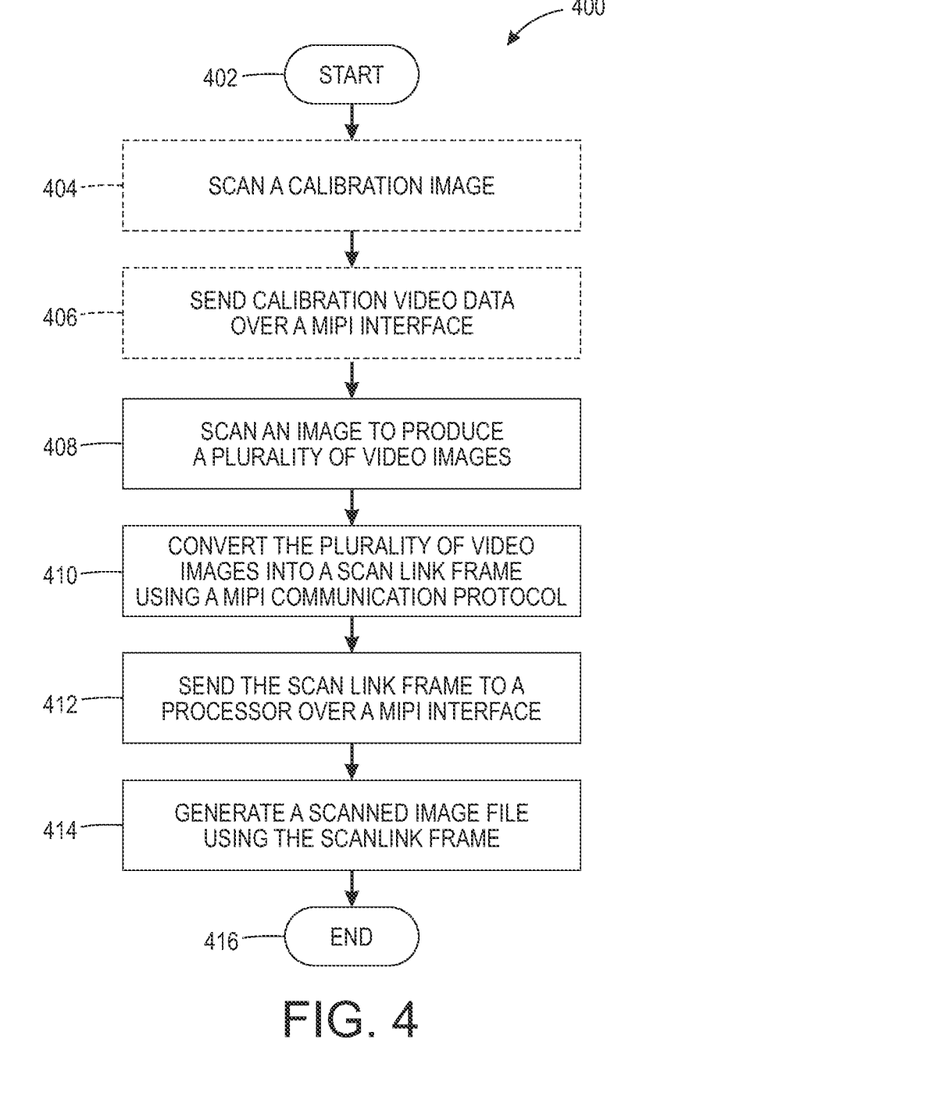
FIG. 4 illustrates a flowchart of an example method for transferring data over a MIPI.
Figure 5:
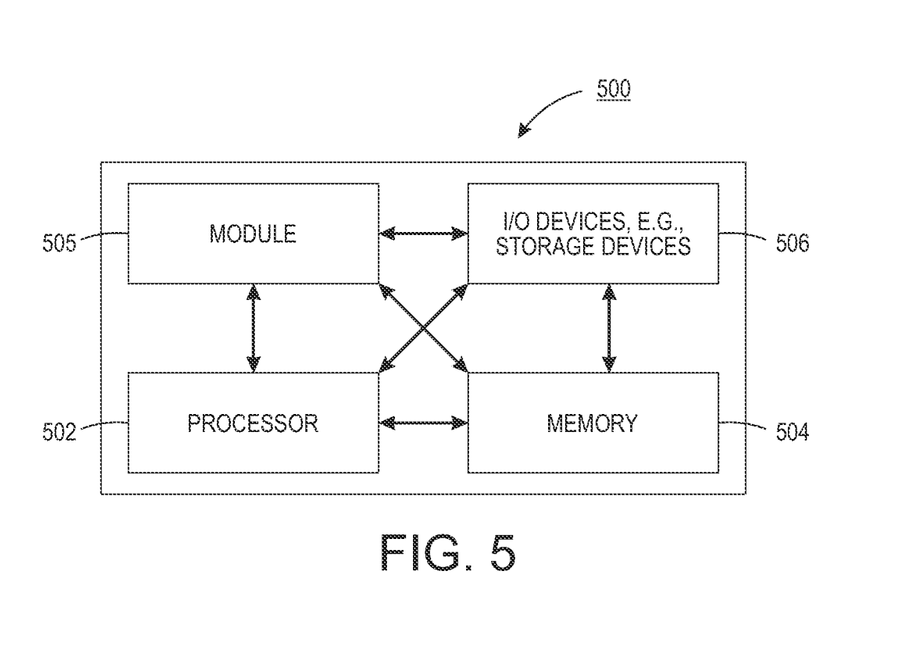
FIG. 5 illustrates a high-level block diagram of a computer suitable for use in performing the functions described herein.

FIG. 4 illustrates a flowchart of a method 400 for transferring data over a MIPI. In one embodiment, one or more steps or operations of the method 400 may be performed by the apparatus 100 or a computer as illustrated in FIG. 5 and discussed below.

At block 402 the method 400 begins. At optional block 404, the method 400 scans a calibration image. For example, the scanner may need to be calibrated to process the video images of the image that is scanned. In one embodiment, the calibration image may be performed periodically (e.g., every day, every week, every 1000 scans, and the like).

In one embodiment, the calibration image may be scanned with the light source turned off to obtain black calibration video images. In addition, the calibration image may be scanned with the light source turned on to obtain white calibration video images.

At optional block 406, the method 400 sends calibration video data over a MIPI interface. In one embodiment, the black calibration video images may be formatted into a black calibration scanlink frame that is compatible with the MIPI interface. In addition, the white calibration video images may be formatted into a white calibration scanlink frame that is compatible with the MIPI interface. The black calibration scanlink frame and the white calibration scanlink frame may be transmitted to a processor via the MIPI interface.

At block 408, the method 400 scans an image to produce a plurality of video images. For example, a scan bar may scan a plurality of scan lines of video images as the image is automatically moved below the scan bar, or vice versa.

At block 410, the method 400 converts the plurality of video images into a scanlink frame using a MIPI communication protocol. In one embodiment, the plurality of video images may be generated by an AFE module. The video images may not be compatible with the MIPI interface. As a result, a translation logic module may be used to convert the plurality of video images into a RAWxx format that is compatible with the MIPI interface and package the converted video images into a scanlink frame.

As discussed above, the scanlink frame may include a frame start packet, a scanlink header packet, the plurality of video images that are converted and a frame end packet. In one embodiment, each scan line of the plurality of video images that are converted may be a line within the scanlink frame. In other words, the scanlink frame may include a number of lines that corresponds to the number of scan lines of the plurality of video images plus one to account for the scanlink header packet. In one embodiment, each line may include a start of line packet, the video images of a scan line and an end of line packet.

In one embodiment, the scanlink header packet may include metadata associated with the image that is scanned. In one embodiment, the metadata may include, for example, a type of data that is being transmitted, a type of color, a page size, a charged coupled device (CCD) color registration offset, a data resolution, and the like.

Notably, the novel scanlink frame of the present disclosure provides flexibility in allowing a variety of different types of data to be transmitted over the MIPI interface. In addition, no side channels or additional communication paths are needed to transmit the metadata to the processor for processing. Thus, the embodiments of the present disclosure provide an efficient architecture that utilizes the standardized protocol of MIPI.

At block 412, the method 400 sends the scanlink frame to a processor over a MIPI interface. For example, the scanlink frame including the scanlink header packet and the lines of video images are transmitted to a processor of a system controller or DFE.

At block 414, the method 400 generates a scanned image file using the scanlink frame. In one embodiment, a microprocessor or processor may be used to process the scanlink frame to generate the scanned image. Notably, the microprocessor or processor is not equivalent to an ASIC and should not be interpreted to include an ASIC. At step 416 the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to improve color accuracy in a scan, as disclosed herein.

As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for transferring data over a MIPI, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for transferring data over a MIPI (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for transferring data over a MIPI (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for transferring data over a Mobile Industry Processor Interface (MIPI), comprising:
    a scan bar for scanning an image;
    an analog front end (AFE) module in communication with the scan bar for receiving a plurality of video images of the image that is scanned by the scan bar;
    a translation logic module in communication with the AFE module to convert the plurality of video images into a scanlink frame using a MIPI communication protocol, wherein the scanlink frame comprises a frame start packet, a scanlink header packet, the plurality of video images and a frame end packet;
    a MIPI input interface in communication with the translation logic module to receive the scanlink frame; and
    a processor in communication with the MIPI input interface to process the scanlink frame to generate a scanned image file using the scanlink frame.

2. The apparatus of claim 1, further comprising:
    a microcontroller in communication with the AFE module, the translation logic module and the processor to control a motor coupled to the scan bar.

3. The apparatus of claim 1, wherein the plurality of video images is converted into a RAW format as defined by a MIPI Camera Serial Interface 2 (CSI-2) standard.

4. The apparatus of claim 1, wherein the scanlink header packet is preceded by a start of line packet and followed by an end of line packet.

5. The apparatus of claim 1, wherein the scanlink header packet comprises metadata associated with the image that is being scanned.

6. The apparatus of claim 5, wherein the metadata comprises at least one of: a type of data that is being transmitted, a type of color, a page size, a charged coupled device (CCD) color registration offset and a data resolution.

7. The apparatus of claim 1, wherein the plurality of video images is converted as a plurality of lines within the scanlink frame, wherein a number of the plurality of lines corresponds to a number of lines of the plurality of video images scanned of the image by the scan bar.

8. The apparatus of claim 7, wherein each one of the plurality of lines is preceded by a start of line packet and followed by an end of line packet.

9. A method for transferring data over a Mobile Industry Processor Interface (MIPI), comprising:
    scanning an image to produce a plurality of video images;
    converting the plurality of video images into a scanlink frame using a MIPI communication protocol, wherein the scanlink frame comprises a frame start packet, a scanlink header packet, the plurality of video images and a frame end packet;
    sending the scanlink frame to a processor over a MIPI interface; and
    generating, by the processor, a scanned image file using the scanlink frame.

10. The method of claim 9, further comprising:
    sending a black calibration scanlink frame before sending the scanlink frame, wherein the black calibration scanlink frame comprises a plurality of black calibration video images.

11. The method of claim 9, further comprising:
    sending a white calibration scanlink frame before sending the scanlink frame, wherein the white calibration scanlink frame comprises a plurality of white calibration video images.

12. The method of claim 9, wherein the plurality of video images is converted into a RAW format as defined by a MIPI Camera Serial Interface 2 (CSI-2) standard.

13. The method of claim 9, wherein the scanlink header packet is preceded by a start of line packet and followed by an end of line packet.

14. The method of claim 9, wherein the scanlink header packet comprises metadata associated with the image that is being scanned.

15. The method of claim 14, wherein the metadata comprises at least one of: a type of data that is being transmitted, a type of color, a page size, a charged coupled device (CCD) color registration offset and a data resolution.

16. The method of claim 9, wherein the plurality of video images is converted as a plurality of lines within the scanlink frame, wherein a number of the plurality of lines corresponds to a number of lines of the plurality of video images scanned of the image by the scan bar.

17. The method of claim 16, wherein each one of the plurality of lines is preceded by a start of line packet and followed by an end of line packet.

18. The method of claim 9, further comprising:
    sending, by the processor, an acknowledgement signal when the scanlink frame is received.

19. The method of claim 18, further comprising:
generating an error signal when the acknowledgement signal is not received within a predefined time period.

20. A method for transferring data over a Mobile Industry Processor Interface (MIPI), comprising:
scanning a calibration strip with an illumination turned off to produce a plurality of black calibration video images;
converting the plurality of black calibration video images into a black calibration scanlink frame using a MIPI communication protocol, wherein the black calibration scanlink frame comprises a frame start packet, a scanlink header packet, the plurality of black calibration video images, and a frame end packet;
sending the black calibration scanlink frame to a processor over a MIPI interface;
scanning the calibration strip with the illumination turned on to produce a plurality of white calibration video images;
converting the plurality of white calibration video images into a white calibration scanlink frame using the MIPI communication protocol, wherein the white calibration scanlink frame comprises a frame start packet, a scanlink header packet, the plurality of white calibration video images and a frame end packet;
sending the white calibration scanlink frame to the processor over the MIPI interface;
scanning an image to produce a plurality of video images;
converting the plurality of video images into a scanlink frame using the MIPI communication protocol, wherein the scanlink frame comprises a frame start packet, a scanlink header packet, the plurality of video images and a frame end packet;
sending the scanlink frame to the processor over the MIPI interface; and
generating, by the processor, a scanned image file using the black calibration scanlink frame, the white calibration scanlink frame and the scanlink frame.

* * * * *